United States Patent
Mehta et al.

(10) Patent No.: US 6,350,091 B1
(45) Date of Patent: Feb. 26, 2002

(54) HANDLE GROMMET ASSEMBLY

(75) Inventors: Nandan R. Mehta; Frank V. Pliml, Jr., both of Arlington Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/655,599

(22) Filed: Sep. 5, 2000

(51) Int. Cl.[7] ............................................. F16B 13/06
(52) U.S. Cl. ........................... 411/48; 411/41; 411/51
(58) Field of Search ............................... 411/41, 45, 46, 411/48, 50, 51, 64

(56) References Cited

U.S. PATENT DOCUMENTS

| | | | |
|---|---|---|---|
| 3,417,438 A | | 12/1968 | Schuplin |
| 3,737,128 A | | 6/1973 | Schuplin |
| 3,905,570 A | | 9/1975 | Nieuwveld |
| 4,085,651 A | * | 4/1978 | Koscik ..................... 411/41 X |
| 4,312,614 A | | 1/1982 | Palmer et al. |
| 4,405,272 A | * | 9/1983 | Wollar ......................... 411/41 |
| 4,571,134 A | | 2/1986 | Beglinger et al. |
| 5,028,187 A | | 7/1991 | Sato |
| 5,368,261 A | | 11/1994 | Caveney |
| 5,387,065 A | * | 2/1995 | Sullivan ....................... 411/48 |
| 5,567,098 A | * | 10/1996 | Gordon ........................ 411/48 |
| 5,775,860 A | | 7/1998 | Meyer |
| 6,196,756 B1 | * | 3/2001 | Leverger .................. 411/48 X |

* cited by examiner

Primary Examiner—Neill Wilson
(74) Attorney, Agent, or Firm—Pitney, Hardin, Kipp & Szuch LLP

(57) ABSTRACT

The grommet assembly includes a grommet head and a pin. The pin includes longitudinal guide channels and an enlarged head which may include undercuts formed immediately underneath the enlarged head. The grommet head includes grommet segments secured radially by radial bands with a nose band forming the tip of the grommet head. An aperture is formed between the grommet segments, with guide ridges formed on the interior arcuate walls to engage said longitudinal guide channels. The aperture further includes inwardly ramped surfaces which are forced apart by the enlarged head of the pin during insertion. Thereafter, in the fully installed position, the inwardly ramped surfaces engage the undercuts formed beneath the enlarged head.

18 Claims, 5 Drawing Sheets

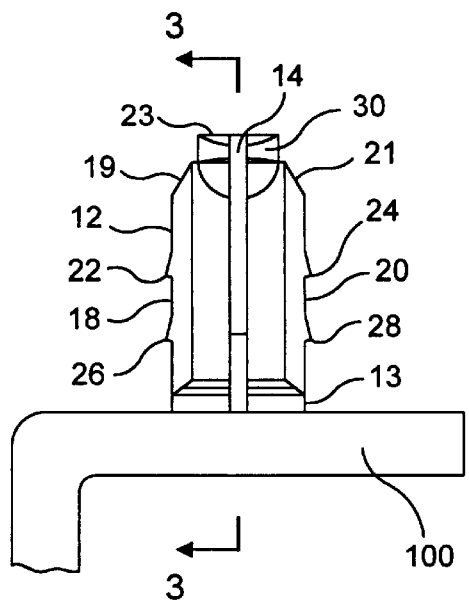
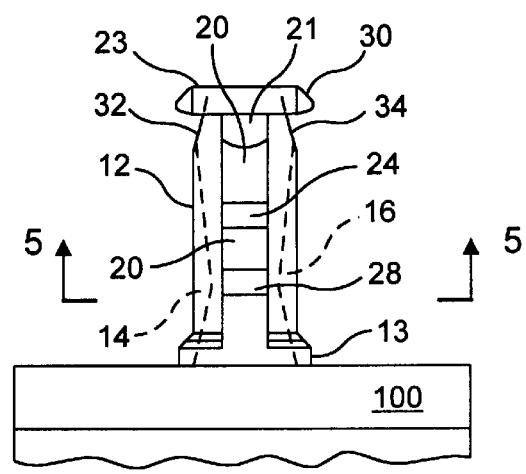
FIG. 1
FIG. 2
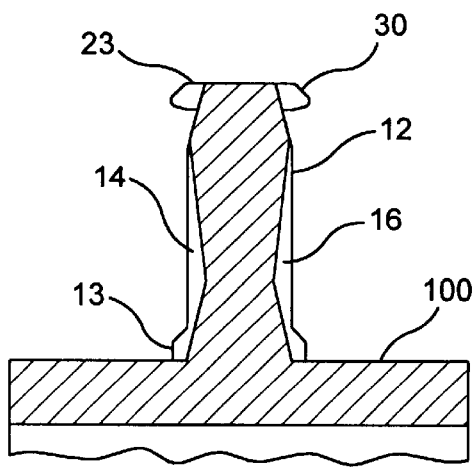
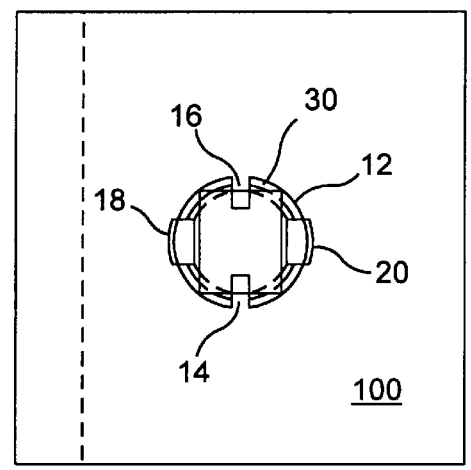
FIG. 3
FIG. 4
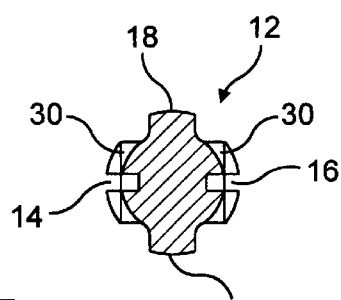
FIG. 5

HANDLE GROMMET ASSEMBLY

BACKGROUND OF THE INVENTION

1. Field of the Invention

This invention pertains to a grommet, such as those used to secure handles to a desk drawer and similar applications, which is installed with a linear motion.

2. Description of the Prior Art

In the prior art, threaded members, such as screws, are frequently used to attach handles to desks, and are likewise used for many similar applications. However, the use of threaded members requires access to both sides of the panel to which the threaded member is being secured and can add to installation costs. Alternatively, many types of grommets are available. However, many of these grommets are shipped as two separate pieces, which adds to the installation costs. Similarly, many of these grommets do not provide for the secured piece to be flush with the panel to which the piece is secured.

U.S. Pat. No. 5,028,187 entitled "Security Fastener Including Integral Plug Body and Socket Body", issued on Jul.2, 1991 to Sato discloses a security fastener including integral plug and socket bodies, including a tip member providing a pull structure, including a joining support member which joins the two halves of a socket body.

U.S. Pat. No. 5,775,860 entitled "Plastic Rivet Having Integral Drive Pin and Body", issued on Jul. 7, 1998 to Meyer discloses a plastic rivet having an integral drive pin and body, including a nose and point for use as a pull structure.

U.S. Pat. No. 3,905,570 entitled "Resilient Fastening Devices", issued on Sep. 16, 1975 to Nieuwveld discloses a resilient fastening device, including structures extending out from the aperture that has received the fastening means.

Other prior art references include U.S. Pat. No. 5,368,261 entitled "Cable Mount and Fixture", issued on Nov. 29, 1994 to Caveney et al.; U.S. Pat. No. 4,571,134 entitled "Two-Piece Plastic Fastener and Apparatus for Molding Same", issued on Feb. 18, 1986 to Beglinger et al.; U.S. Pat. No. 4,312,614 entitled "Security Fastener", issued on Jan. 26, 1982 to Palmer et al.; U.S. Pat. No. 3,737,128 entitled "Cable Support Clip", issued on Jun. 5, 1973 to Schuplin; and U.S. Pat. No. 3,417,438 entitled "Deformable Polymeric Fastening Device", issued on Dec. 24, 1968 to Schuplin.

OBJECTS AND SUMMARY OF THE INVENTION

It is therefore an object of this invention to provide a grommet assembly which can be installed with a single linear motion.

It is therefore a further object of this invention to provide a grommet assembly which can be installed with access to only a single side of the panel to which the grommet assembly is being installed.

It is therefore a further object of this invention to provide a grommet assembly which can be shipped as a single pre-installed configuration.

It is therefore a still further object of this invention to provide a grommet assembly which allows flush installation of the attached object to the engaged panel.

These and other objects are attained by providing a grommet assembly comprising a pin which is typically integral with the device being installed, and arising from a countersunk recess therewithin. The pin includes longitudinal guide channels along the length thereof and a radially enlarged head. The pin includes one or two pairs of barbs and further may include undercuts formed beneath the radially enlarged head. The first pair of barbs holds the grommet head in the pre-installed configuration and the optional second pair of barbs assists in holding the grommet head in the installed configuration. The grommet head includes two segments, each with a guide groove for engaging the respective guide channels of the pin. The guide grooves terminate near the end of the segments with inwardly extending ramped surfaces which engage the undercuts beneath the radially enlarged head of the pin in the fully installed configuration. The segments are held together by radial bands which engage the pairs of barbs of the pin, in both the pre-installed and fully installed position, and with a living hinge-type nose band configuration which allows sufficient elasticity and compliance to allow the radially enlarged head to ramp over the inwardly extending ramps and to remain in a detent configuration thereafter wherein the grommet segments are forced apart, particularly near the nose of the grommet head.

The segments of the grommet head further include a circumferential groove at the tail end for the seating of the aperture of the panel. Prior to the enlarged radial head of the pin forcing the grommet segments apart, the grommet head is intended to be easily inserted into the apertures of the panel. After the enlarged radial head of the pin forces the grommet segments apart in a detent configuration, however, the grommet head is securely attached to the panel. This configuration allows a single linear motion to insert the grommet head into the aperture of the panel, to seat the grommet head within the aperture of the panel and to lock the grommet assembly into a detent configuration.

BRIEF DESCRIPTION OF THE DRAWINGS

Further objects and advantages of the invention will become apparent from the following description and claims, and from the accompanying drawings, wherein:

FIG. 1 is a side plan view of the pin of the grommet assembly of the present invention, shown without the countersunk recess.

FIG. 2 is a side plan view of the pin of the grommet assembly of the present invention, rotated 90 degrees from FIG. 1.

FIG. 3 is a cross-sectional view along plane 3—3 of FIG. 1, showing the pin of the grommet assembly of the present invention.

FIG. 4 is a top plan view of the pin of the grommet assembly of the present invention.

FIG. 5 is a cross-sectional view along plane 5—5 of FIG. 3, showing the pin of the grommet assembly of the present invention.

DETAILED DESCRIPTION OF THE PREFERRED EMBODIMENT

Figure 11:
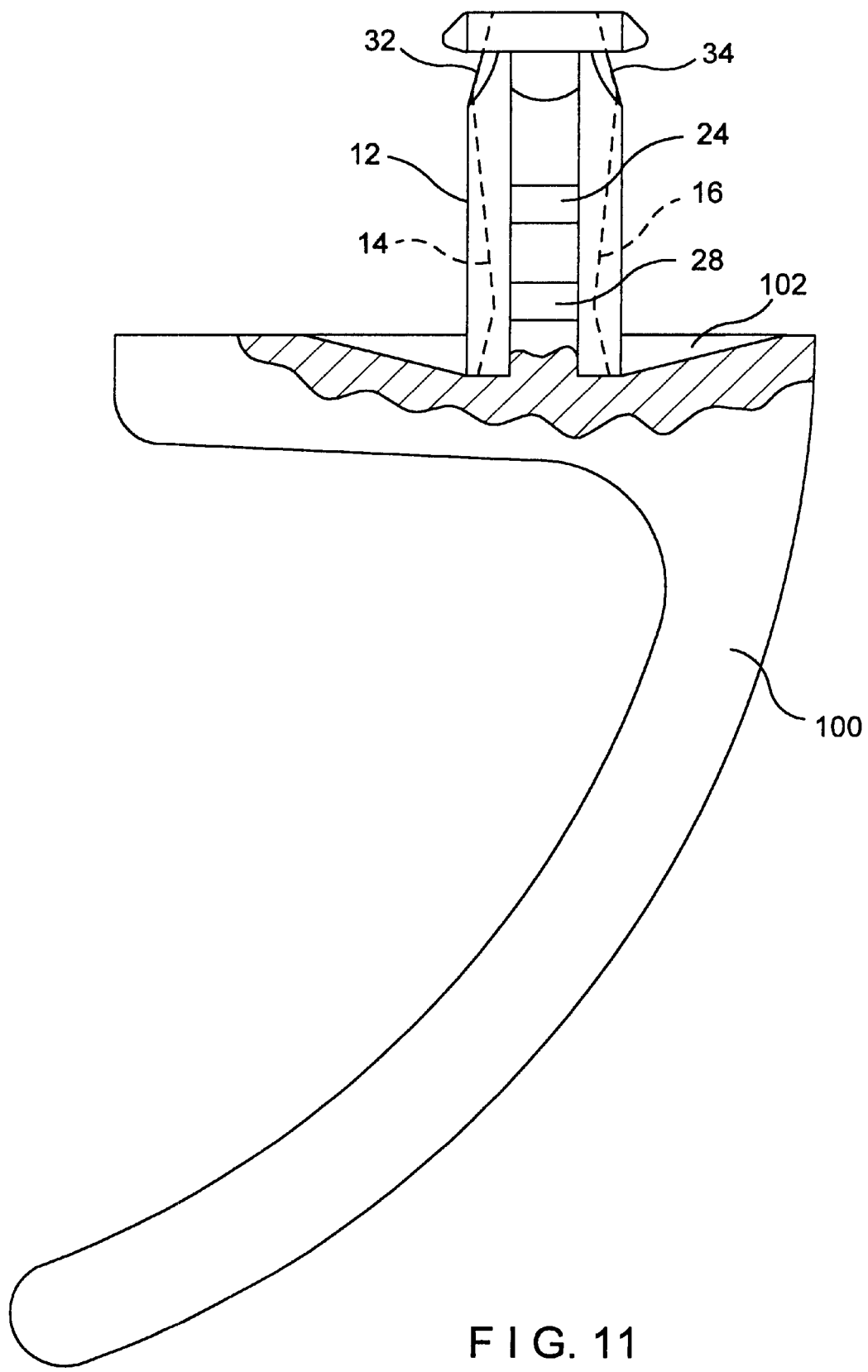
FIG. 11 is a side plan view, partially in phantom, of the pin of the grommet assembly of the present invention, shown rising from a countersunk recess on a handle assembly.
Figure 12:
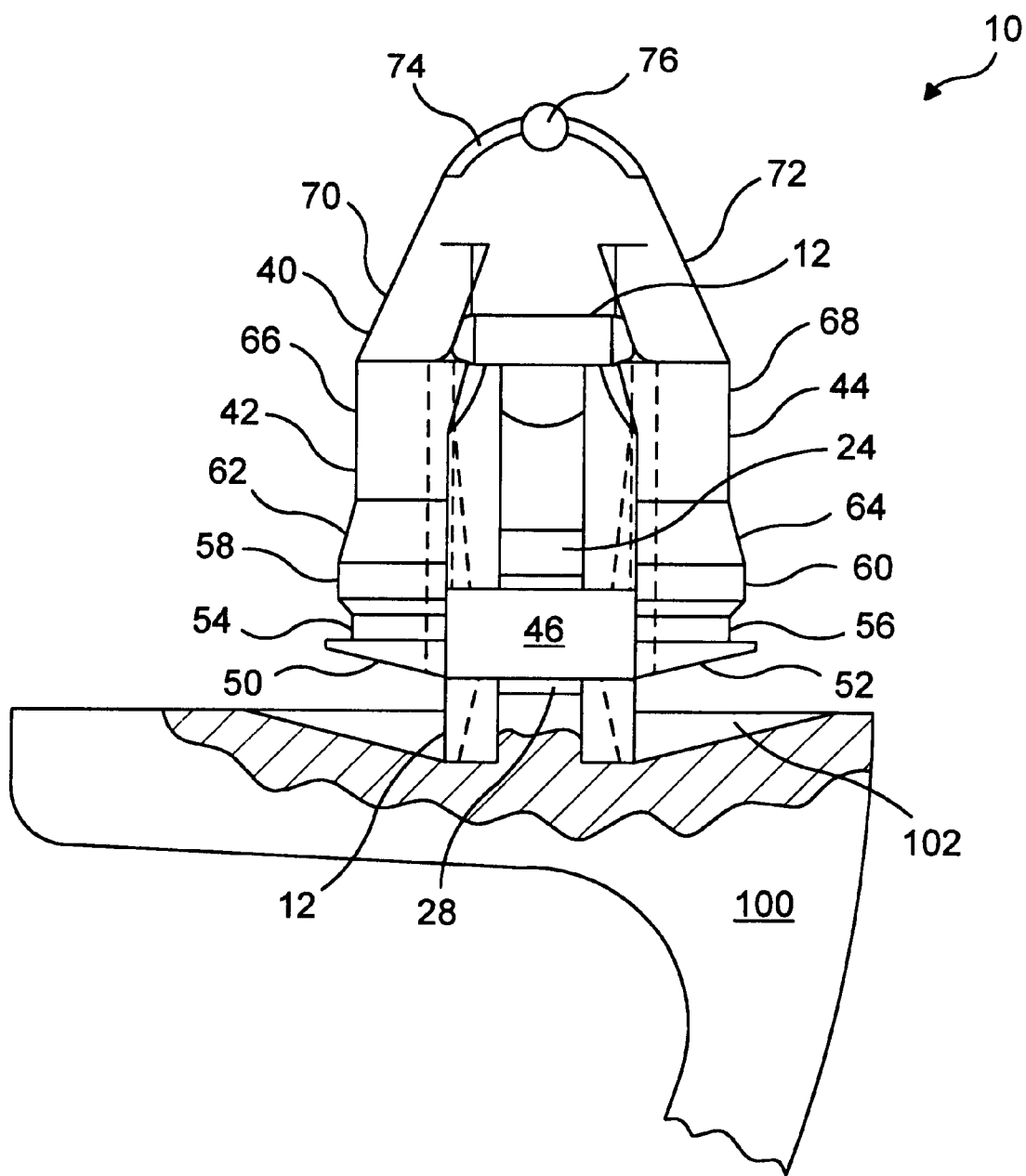
FIG. 12 is a side plan view, partially in phantom, showing the grommet head in the pre-installed position on the pin of the grommet assembly of the present invention.
Figure 13:
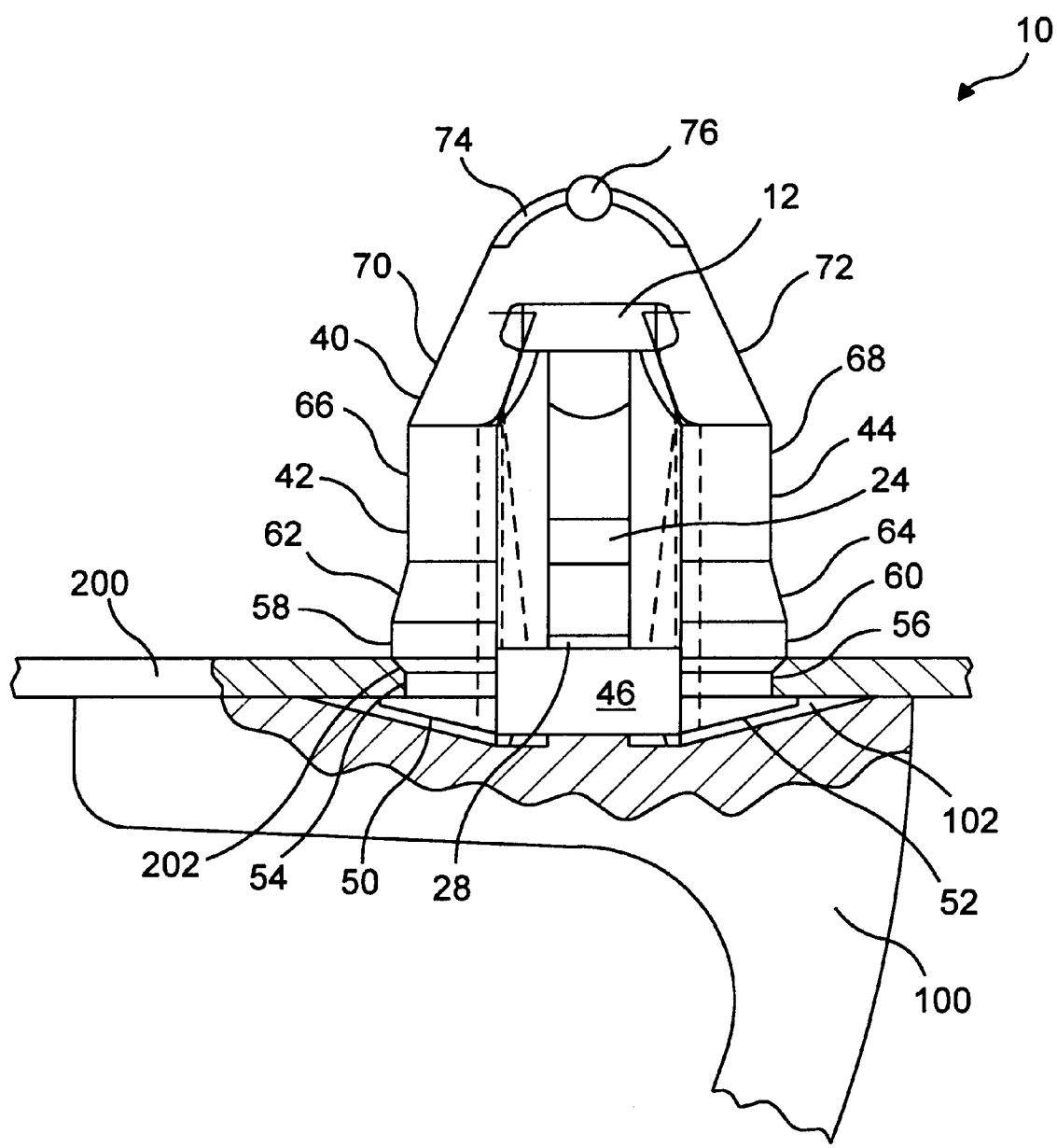
FIG. 13 is a side plan view, partially in phantom, showing the grommet head in the fully installed position on the pin of the grommet assembly of the present invention.

Referring now to the drawings in detail wherein like numerals refer to like elements throughout the several views, one sees from FIGS. 1–5 and 11–13 that pin 12 of grommet assembly 10 is of generally cylindrical shape and integrally rises from handle 100. The configuration with base 13 at the union of pin 12 and handle 100 is illustrated in FIGS. 1–4. Alternately, countersunk recess 102 is illustrated in FIGS. 11–13 and, particularly as shown in FIG. 13, allows for a more flush installation of handle 100 to panel 200 (panel 200 typically being the front panel of a desk drawer, although many similar applications can use grommet assembly 10). Pin 12 includes two longitudinal guide channels 14, 16 opposed 180 degrees from each other. As shown in FIG. 2, longitudinal guide channels can be bowed somewhat inwardly. Longitudinal ridges 18, 20 are formed 180 degrees from each other and 90 degrees from longitudinal guide channels 14, 16 from the perspective of FIGS. 4 and 5. Longitudinal ridges 18, 20 terminate in ramped surfaces 19, 21 proximate to distal end 23 of pin 12. Downwardly oriented pre-installation barbs 22, 24 are formed on a central location of longitudinal ridges 18, 20 and optional downwardly oriented full installation barbs 26, 28 are formed proximate to base 13 of pin 12. Pin 12 terminates in radially enlarged detent head 30 at distal end 23, through which guide channels 14, 16 extend. As shown in FIG. 2, undercuts 32, 34 may be formed under radially enlarged detent head 30 to increase the effect of the radial protrusion of detent head 30.

As shown in FIGS. 6–10, grommet head 40 of grommet assembly 10 includes arcuate grommet segments 42, 44 which each span approximately 120 degrees of the circumference of pin 12 and are held to each other by radial bands 46, 48 which each span approximately 60 degrees of the circumference of pin 12. Grommet head 40 is typically made of "supertough" nylon, although those skilled in the art will recognize that many alternative materials can be used. The exterior of arcuate grommet segments 42, 44 includes chamfered bases 50, 52 (which correspond to the embodiment of pin 12 illustrated in FIGS. 11–13 rising from countersunk recess 102, a squared-off base would be used with the embodiment of pin 12 without countersunk recess 102 illustrated in FIGS. 1–5). Circumferential groove sections 54, 56, of a diameter equal to that of the aperture 202 (see FIG. 13) of panel 200 intended to be engaged are formed inwardly adjacent from chamfered bases 50, 52. Enlarged cylindrical sections 58, 60 are formed adjacent to circumferential groove sections 54, 56. Toroidal ramp sections 62, 64 lead from enlarged cylindrical sections 58, 60 to cylindrical sections 66, 68. Cylindrical sections 66, 68 may be the diameter of the aperture 202 (see FIG. 13) of panel 200 intended to be engaged so that cylindrical sections 66, 68 are able to center grommet head 40 during insertion into aperture 202. Toroidal ramp nose sections 70, 72 are formed adjacent to cylindrical sections 66, 68. Nose band 74, which somewhat resembles the structure of a living hinge, extends between toroidal ramp nose sections 70, 72. Apex 76 of nose band 74 is enlarged and forms a tip for the initial guiding of grommet head 40 into aperture 202.

Figure 8:
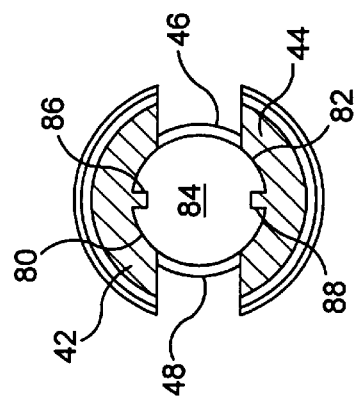
FIG. 8 is a cross-sectional view along plane 8—8 of FIG. 6, showing the grommet head of the grommet assembly of the present invention.
Figure 10:
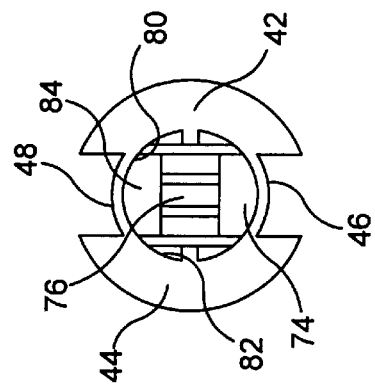
FIG. 10 is a top plan view of the grommet head of the grommet assembly of the present invention.
Figure 7:
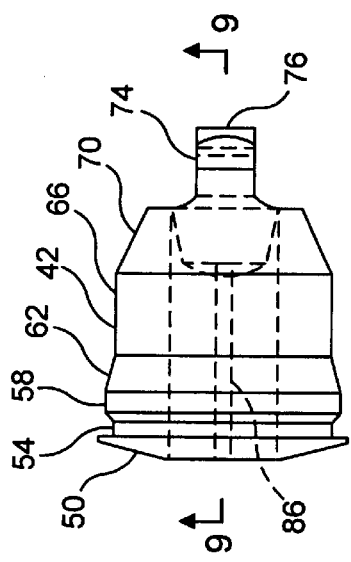
FIG. 7 is a side plan view, partially in phantom, of the grommet head of the grommet assembly of the present invention, rotated 90 degrees from FIG. 6.
Figure 9:
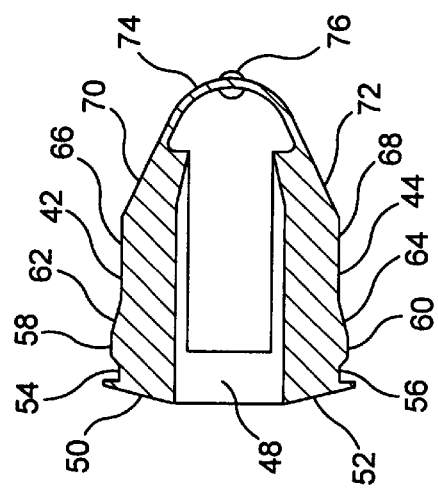
FIG. 9 is a cross-sectional view along plane 9—9 of FIG. 7, showing the grommet head of the grommet assembly of the present invention.
Figure 6:
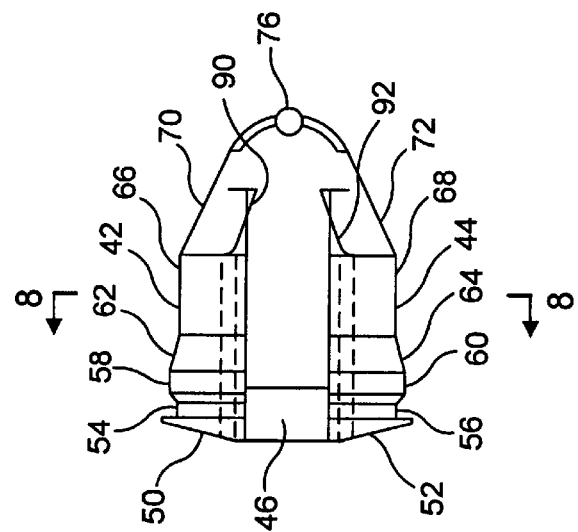
FIG. 6 is a side plan view, partially in phantom, of the grommet head of the grommet assembly of the present invention, shown with a chamfered base intended to be complementary to a countersunk recess from which the pin of the grommet assembly rises.

As best shown in FIGS. 8 and 10, grommet segments 42, 44 include interior concave arcuate walls 80, 82 which, in combination with radial bands 46, 48 form aperture 84 of generally circular cross section into which pin 12 is inserted. Longitudinal guide ridges 86, 88 are formed on interior concave arcuate walls 80, 82 to engage guide channels 14, 16 of pin 12 during and after the installation of grommet head 40 onto pin 12. This assures the correct rotational orientation of grommet head 40 with respect to pin 12 and prevents any relative rotation therebetween. As shown in FIGS. 6 and 9, as interior concave arcuate walls 80, 82 enter toroidal ramp nose sections 70, 72, inwardly extending detent ramps 90, 92 are formed. As pin 12 is inserted into aperture 84 of grommet head 40, radially enlarged detent head 30 urges against inwardly extending detent ramps 90, 92 thereby urging grommet segments 40, 42 apart, particularly in the region of toroidal ramp nose sections 70, 72, thereby further urging nose band 74 toward a somewhat flat, and possible somewhat stretched position. After radially enlarged detent head 30 clears inwardly extending detent ramps 90, 92 due to the continued insertion of pin 12 into grommet head 40, nose band 74 urges grommet segments 42, 44 toward each other so that toroidal ramp nose sections 70, 72 engage undercuts 32, 34 of pin 10 immediately beneath radially extended detent head 30. Grommet segments 42, 44 are held sufficiently far apart in this configuration as shown in FIG. 13, so as to tightly engage aperture 202 of panel 200 within circumferential groove sections 54, 56.

In order to install grommet assembly 10 along with handle 100, the installer begins with grommet 10 (either as provided to the installer or configured by the installer) in the pre-installed configuration as shown in FIG. 10 wherein radial bands 46, 48 are held between pre-installation barbs 22, 24 (which further inhibit the removal of grommet head 40 from pin 12) and optional full installation barbs 26, 28. The user then holds handle 100 (or similar structure), guides apex 76 of nose band 74 into aperture 202 of panel 200 and, in a single linear movement, urges handle 100 toward panel 200 so that aperture 202 seats in circumferential groove 54, 56 and pin 12 is driven into grommet head 40 so that the fully installed position, as shown in FIG. 13 and as previously described, is reached. In this position, toroidal ramp nose sections 70, 72 have been urged apart and engage undercuts 32, 34 below radially enlarged detent head 30 of pin 12 thereby enlarging grommet assembly 10 to tightly engage aperture 202 of panel 200. Moreover, the required pull-out force can be increased by circumferential bands 46, 48 being engaged by optional full installation barbs 26, 28.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A grommet assembly including:

a pin including a first guide element and an enlarged head;

a grommet head including an aperture into which said pin is inserted, said aperture including a second guide element for engaging said first guide element to prevent relative rotation between said grommet head and said pin and further including inwardly extending ramped surfaces;

wherein one of said first and second guide elements is at least one longitudinal groove and another of said first and second guide elements is at least one longitudinal ridge complementary to said at least one longitudinal groove; and wherein during insertion of said pin into said aperture, said enlarged head forces said inwardly extending ramped surfaces away from each other and thereafter, in a fully installed position, said inwardly extending ramped surfaces detent engage said pin proximate to said enlarged head.

2. The grommet assembly of claim 1 wherein said grommet head includes at least two grommet segments, each grommet segment forming a portion of a circumference of said grommet head.

3. The grommet assembly of claim 2 wherein said at least two grommet segments are secured to each other by circumferential bands.

4. The grommet assembly of claim 3 wherein a tip of said grommet head is formed by a nose band passing between said at least two grommet segments, said nose band passing over a longitudinal axis of said aperture.

5. The grommet assembly of claim 4 wherein said nose band is secured to said at least two grommet segments proximate to said inwardly extending ramped surfaces.

6. The grommet assembly of claim 5 wherein said grommet head includes a circumferential groove for seating within an aperture of a panel.

7. The grommet assembly of claim 6 wherein said grommet head has portions of increasing diameter formed between said nose band and said circumferential groove.

8. The grommet assembly of claim 7 wherein said pin arises from a countersunk recess.

9. The grommet assembly of claim 8 wherein a surface outwardly adjacent from said countersunk recess is aligned with said circumferential groove, whereby a panel engaged by said circumferential groove is flush with said surface outwardly adjacent from said countersunk recess in said fully installed position.

10. The grommet assembly of claim 9 wherein said grommet head includes a chamfered base to engage said countersunk recess.

11. The grommet assembly of claim 10 wherein said pin includes at least one first protrusion for holding said grommet head in a pre-installed position.

12. The grommet assembly of claim 11 wherein said at least one first protrusion engages at least one of said circumferential bands.

13. The grommet assembly of claim 12 wherein said pin includes at least one second protrusion for holding said grommet in said fully installed position.

14. The grommet assembly of claim 13 wherein said at least one second protrusion engages at least one of said circumferential bands.

15. The grommet assembly of claim 14 wherein at least one of said circumferential bands is engaged between said at least one first protrusion and said at least one second protrusion in said pre-installed position.

16. The grommet assembly of claim 15 wherein undercuts are formed on said pin immediately below said enlarged head and wherein said inwardly extending ramped surfaces engage said undercuts in said fully installed position.

17. a pin having a base and a spaced apart head, a first undercut engagement surface, and a second undercut engagement surface, each engagement surface extending between the base and the head; and a grommet head having an aperture into which the pin is inserted, the grommet head including a first segment and a second segment each of which includes an interior, generally concave arcuate radial wall having an inwardly extending resilient ramp surface, and both of which at least partially define the aperture;

wherein during insertion of the pin into the aperture, the head forces the inwardly extending resilient ramp surfaces away from each other and, such that once installed in a fully installed position, the inwardly extending resilient ramp surfaces respectively engage the undercut engagement surfaces to secure the pin to the grommet head.

18. A grommet assembly of claim 17 wherein the base of the pin includes a counter-sunk recess that when the grommet assembly is in the fully installed position, the base is adapted to be substantially flush against a mating surface.

* * * * *